United States Patent
Barga et al.

(10) Patent No.: US 8,452,792 B2
(45) Date of Patent: May 28, 2013

(54) DE-FOCUSING OVER BIG DATA FOR EXTRACTION OF UNKNOWN VALUE

(75) Inventors: Roger Barga, Bellevue, WA (US); Alexander Sasha Stojanovic, Los Gatos, CA (US); Henricus Johannes Maria Meijer, Mercer Island, WA (US); Carl Carter-Schwendler, Redmond, WA (US); Michael Isard, San Francisco, CA (US); Savas Parastatidis, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 33 days.

(21) Appl. No.: 13/284,853

(22) Filed: Oct. 28, 2011

(65) Prior Publication Data

US 2013/0110872 A1    May 2, 2013

(51) Int. Cl.
*G06F 17/30* (2006.01)
(52) U.S. Cl.
USPC ........... 707/765; 707/736; 707/766; 707/767; 707/768; 707/774; 707/769; 707/770; 707/771; 707/772; 707/773; 707/775
(58) Field of Classification Search
USPC ......................................... 707/736, 765–775
See application file for complete search history.

(56) References Cited

U.S. PATENT DOCUMENTS

| | | | |
|---|---|---|---|
| 7,966,340 B2 | 6/2011 | Friedman | |
| 2006/0080285 A1 | 4/2006 | Chowdhuri | |
| 2008/0162409 A1 | 7/2008 | Meijer | |
| 2008/0208830 A1* | 8/2008 | Lauckhart et al. | 707/4 |
| 2011/0071975 A1* | 3/2011 | Friedlander et al. | 706/47 |
| 2011/0131199 A1 | 6/2011 | Simon | |
| 2012/0051628 A1* | 3/2012 | Noguchi et al. | 382/159 |
| 2012/0095951 A1* | 4/2012 | Ray | 706/47 |
| 2012/0158738 A1* | 6/2012 | Buehrer et al. | 707/748 |

OTHER PUBLICATIONS

Runtime Query Optimization, Scale-out Quads Query, 100% Native SPARQL, and the RWStore, Jul. 4, 2011, http://www.bigdata.com/bigdata/blog/?p=181.
Chun Jin and Jaime Carbonell, Argus: Efficient Scalable Continuous Query Optimization for Large-Volume Data Streams; pp. 256-262; http://ieeexplore.ieee.org/stamp/stamp.jsp?tp=&arnumber=4041627.
Serge Abiteboul, et al.; MAD Skills: New Analysis Practices for Big Data, Aug. 2009, VLDB Endowment, vol. 2, Issue 2, pp. 1481-1492; http://portal.acm.org/citation.cfm?id=1687576.
Hadoop and NoSQL Technologies and the Oracle Database, Feb. 2011, Oracle. White Paper, http://www.oracle.com/technetwork/database/hadoop-nosql-oracle-twp-398488.pdf.

* cited by examiner

*Primary Examiner* — Frantz Coby
(74) *Attorney, Agent, or Firm* — Rau Patents, LLC

(57) ABSTRACT

Techniques for defocusing queries over big datasets and dynamic datasets are provided to broaden search results and incorporate all potentially relevant data and avoid overly narrowing queries. An analytic component can receive queries directed at one region of a dataset and analyze the queries to generate inferences about the queries. The queries can then be defocused by a defocusing component and incorporate a larger dataset than originally searched to broaden the queries. The larger dataset can incorporate all, or a part of the original dataset and can also be disparate from the original dataset. Clusters of queries can also be merged and unified to deal with 'local minima' issues and broaden the understanding of the dataset. In other embodiments, dynamic data can be monitored and changes tracked, to ensure that all portions of the dataset are being searched by the queries.

20 Claims, 10 Drawing Sheets

DE-FOCUSING OVER BIG DATA FOR EXTRACTION OF UNKNOWN VALUE

TECHNICAL FIELD

The subject disclosure relates to defocusing a query or set of queries for big datasets for extraction of an unknown value, and related embodiments.

BACKGROUND

Search tools provide users with the ability to quickly and efficiently search for items of interest. The search results can provide feedback to enable the searcher to narrow the scope of queries in order to provide more relevant data. Successive queries can eventually narrow the results and exclude unwanted data until the subject, or target result, of the search is acquired. However, the narrowing of the search results too early in a search can present problems where relevant data is excluded early on.

This problem is particularly evident when the data set being searched is large or changing. Once a promising lead is discovered, analysts can become myopic and quickly narrow the search, excluding other potentially relevant information. For dynamic datasets, new information can potentially be ignored completely as the user has already narrowed the search into the pre-existing data. Clusters of disjointed searches can also result, where numerous queries into disparate sets of data may be related, but the connections are not readily apparent.

Recommendation and optimization systems can also suffer from overly focused queries and data. A user experience optimization system can learn user preferences based on user feedback and history, but the recommendations can be too narrow, and not fully represent the interests or desires of the user. Furthermore, positive feedback loops tend to occur, where users are presented with a limited range of recommendations to select from at each iteration, successively narrowing the recommendations.

The above-described deficiencies of today's code generation and memory management schemes are merely intended to provide an overview of some of the problems of conventional systems, and are not intended to be exhaustive. Other problems with the state of the art and corresponding benefits of some of the various non-limiting embodiments may become further apparent upon review of the following detailed description.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

In accordance with one or more embodiments and corresponding disclosure, various non-limiting aspects are described in connection with defocusing a query or set of queries for big datasets for extraction of an unknown value. For instance, an embodiment includes receiving, by at least one computing device, a first set of queries directed at a first set of data. Then in response to the received queries, analyzing the first set of queries and generating inferences in response to the analyzing the first set of queries, wherein successive queries of the first set of queries are in response to a result of a preceding query. Then a second set of queries is generated in response to the generating the inferences, wherein the second set of queries is directed at a second set of data. The second set of data can be selected from a pool of data where the second set of data is at least partially randomly selected. New data can also be analyzed to determine that the new data is relevant to the subject matter of the first set of queries in response to the analyzing the new data. In response to the determining that the new data is relevant, generating a third set of queries, wherein the third set of queries are directed at the new data. Lastly, feedback relating to the second set of queries can be received, and then a new set of queries can be generated in response to the receiving the feedback.

In one non-limiting implementation, an analytic component is configured to receive queries directed at a first set of data and is further configured to analyze the queries to generate inferences about the queries. Then a defocusing component can be configured to create defocused queries in response to the inferences, wherein the defocused queries are broader than the queries received by the analytic component.

In another non-limiting embodiment, a computer-readable storage medium comprising computer-readable instructions that, in response to execution by a computing system, cause the computing device including at least one processor to perform operations, comprising analyzing received queries and making inferences about the received queries in response to the analyzing. The operations can also include ascertaining a first region of a dataset that the received queries correspond to and determining if another region of the dataset is relevant to the queries in response to the making inferences. The operations can also include defocusing the queries to incorporate the other region of the dataset in addition to the first region of the dataset Other embodiments and various non-limiting examples, scenarios and implementations are described in more detail below.

BRIEF DESCRIPTION OF THE DRAWINGS

Various non-limiting embodiments are further described with reference to the accompanying drawings in which.

DETAILED DESCRIPTION

Overview

By way of introduction, the subject matter disclosed herein relates to various embodiments relating to defocusing search queries over large datasets by broadening queries, directing the queries at different data, utilizing feedback to tailor query recommendations, and generating inferences to facilitate creating new queries. As successive queries are built upon the results obtained from preceding queries, defocusing the queries can incorporate data that may have been inadvertently excluded after overly narrowing the preceding queries.

Thus the ability to defocus a particular query or sets of queries or trend of queries to a more general set, a parallel set, or other related sets of queries based on cross-correlative techniques help to present a user with different queries or different result sets related to a given query. Conceptually, this allows a user to pull back the magnifying effect of a query and see more of the big data in order to provide potentially more relevant queries.

In various embodiments, the ability to combine large data about where a user has been and what the user has been doing is provided to determine related queries or results that may be of interest. In another embodiment, proactive pre-joins and categorization of data, or anticipation of queries and related trends can be exploited when determining of any related data can produce defocused information to see more results than the narrow focus of a given query or set of queries. In other aspects, the defocusing techniques address mechanisms for handling constantly changing data.

In other embodiments, self modifying queries can provide a defocused effect, e.g., re-ordering and optimizing based on feedback. Neural networks can be applied for modifying a query or set of queries. Defocusing and related algorithms can be used to dynamically build channels or insights on big data. Similarly, tours of big data can be made based on automatic classification of contents.

In various other embodiments, a machine learning system can be provided to learn correlations between algorithms and data regions. Algorithms can be analyzed to determine what areas of a dataset are being searched, and subsequently it is possible to identify areas of data that are not being searched, and successive queries can be created or recommended that will incorporate the data not being searched. Additionally, de-clustering tools can be provided to identify clusters of queries and the different areas of the dataset that each cluster of queries correspond to. Once the clusters have been identified, and the relationships between the clusters have been defined, a query or set of queries can be provided that unify the clusters.

De-Focusing Over Big Data for Extraction of Unknown Value

Figure 1:
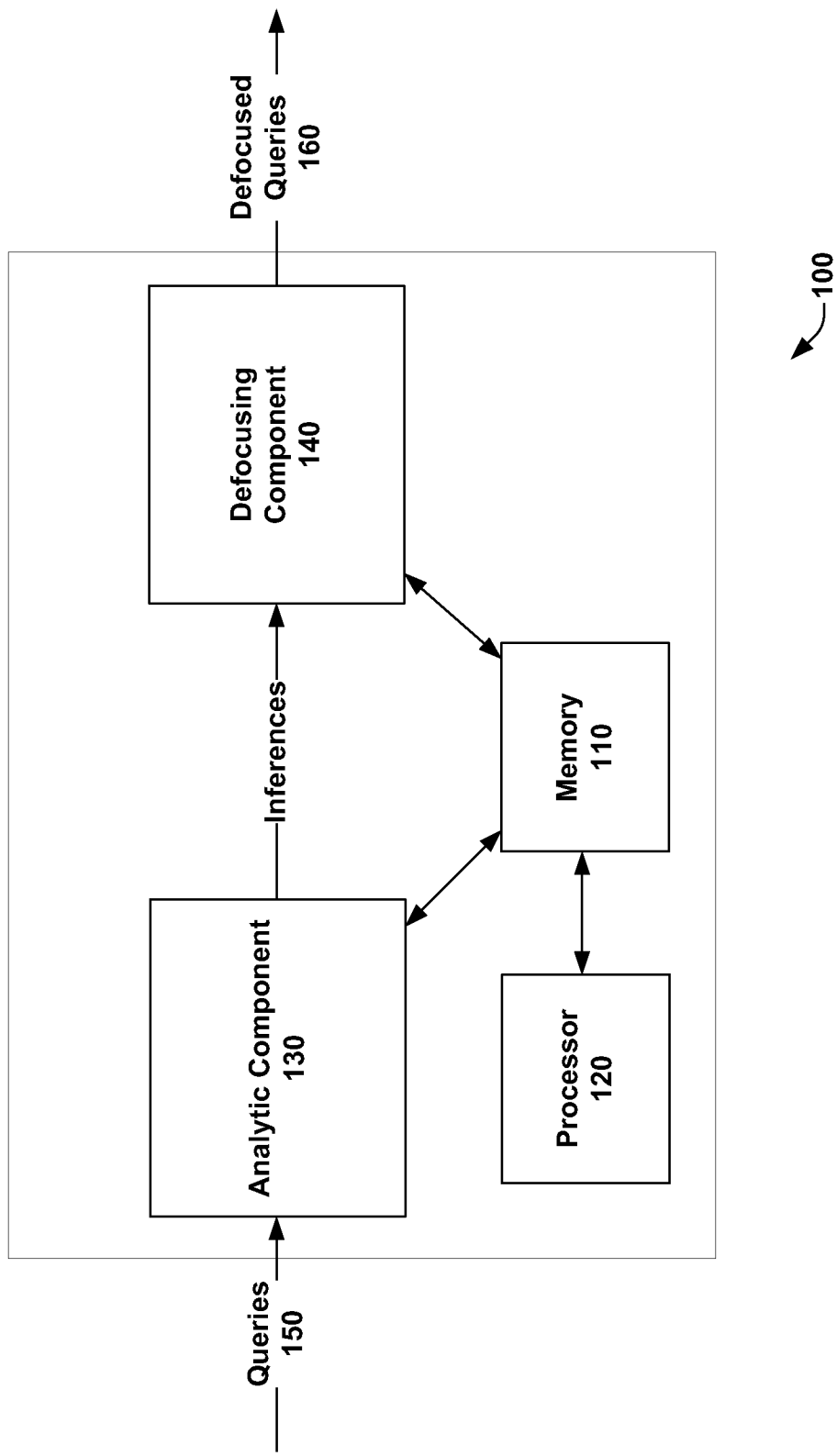
FIG. 1 is a block diagram illustrating an exemplary system that facilitates defocusing of search queries in accordance with an embodiment.

Referring now to the drawings, with reference initially to FIG. 1, system 100 than can facilitate defocusing of queries according to an embodiment is depicted. System 100 can include memory 110 for storing computer executable components and instructions. A processor 120 can facilitate operation of the computer executable components and instructions by the system 100. In this regard, in one embodiment, system 100 can include analytic component 130 which receives and analyzes queries 150, and generates inferences based on the analysis of the first set of queries 150 which are used by defocusing component 140 to generate a defocused queries 160.

The system 100 can include memory 110 having computer executable components stored thereon and a processor 120 communicatively coupled to the memory 110, the processor 120 is configured to facilitate execution of an analytic component 130 configured to receive queries 150 and analyze the queries 150 to generate inferences about the queries. The queries 150 can be a set of unrelated queries, or can be successive queries wherein each succeeding query is in response to results of the preceding queries. Analytic component 130 can determine which data the queries 150 are directed at. This first set of data can be a subset of a large dataset, or can be the entire data set at the time the first set of queries was created.

After receiving the queries 150, the analytic component 130 can generate inferences about the queries 150. The inferences can include inferences about the subject of the search, such as a desired result. The analytic component 130 can incorporate information about the context the queries 150 were created in, such as time, location, and etc., to generate the inferences. The analytic component 130 can also analyze trends in the queries 150, such as successive narrowing of the queries, to generate the inferences.

The processor 120, via the memory 110 is also configured to facilitate execution of a defocusing component 140 that receives the inferences from the analytic component 130 and creates defocused queries 160 in response to the inferences.

In one embodiment, the defocusing component 140 can create defocused queries 160 that are broader than queries 150. The defocusing component 140 can analyze the dataset and determine how broad a query can be to still return a relevant result, and can then create defocused queries 160 that are broader than queries 150.

In another embodiment the defocusing component 140 can direct the queries 150 towards a larger set of data. Searching the larger dataset broadens the query by enlarging the pool of data that can potentially return a relevant result. The larger set of data can include a portion of the first set of data, or can completely incorporate the first set of data in addition to searching new data. In another example, the larger set of data may not include any portion of the first set of data.

In an additional embodiment, the defocusing component 140 can select the second set of data that the defocused queries 160 are directed at in response to the inferences. The defocusing component 140 can analyze the entire dataset, and determine which portions of the entire dataset are likely to return a relevant result based on the inferences. The defocusing component 140 can then be configured to select the second set of data in response to the inferences, where the second set of data is at least partially relevant to the subject of the queries. The defocusing component 140 can further be configured to analyze the first set of data that the queries 150 are searching to determine which areas of the dataset are not being searched, and then incorporate those areas in the second set of data that defocused queries 160 are directed at.

In an additional embodiment, the defocusing component 140 can select the second set of data at least partially randomly. Introducing a small amount of noise or entropy into the selection process avoids stagnation of data selection where the same data is searched repeatedly. A randomizing function or algorithm can be used in the selection of data by defocusing component 140 so that the second set of data is different than the first set of data, providing different results in response to querying the second set of data.

Figure 2:
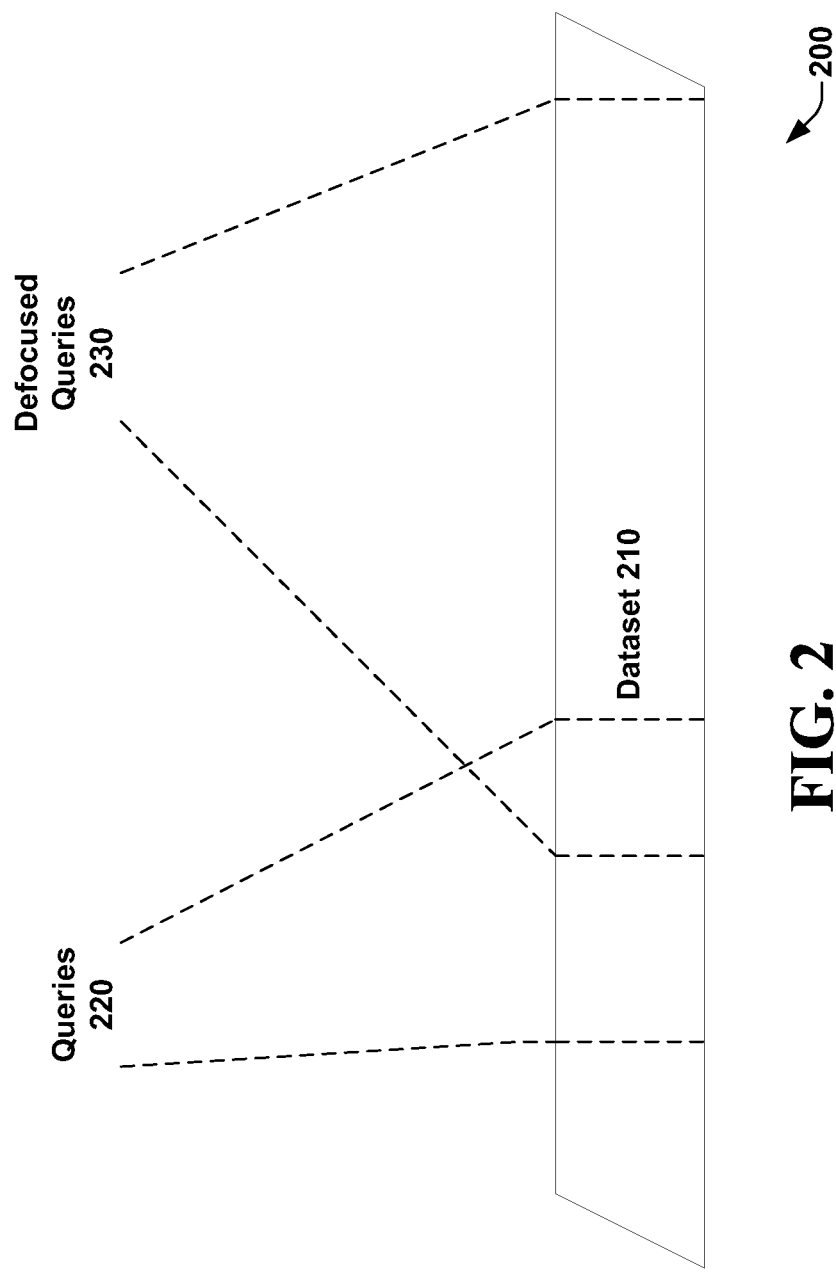
FIG. 2 is a diagram illustrating the regions of an exemplary dataset that queries and defocused queries are directed to in accordance with an embodiment.

Turning now to FIG. 2, a diagram illustrating the regions of an exemplary dataset that queries and defocused queries are directed to in accordance with an embodiment is shown. System 200 shows queries 220 and defocused queries 230 directed at different portions of dataset 210. This graphical representation of the portions of data searched by queries 220 and defocused queries 230 makes it clearer how the defocused queries 230 can be broader than queries 220 by searching a larger portion of the dataset 210.

While the area of dataset 210 searched by defocused queries 230 is shown in FIG. 2 as overlapping in part the region of dataset 210 being searched by queries 220, other embodiments can have different configurations. For instance the second set of data can include at least a portion of the first set of data, or can encompass the entire first set of data. Additionally, the second set of data can be disparate from the first set of data.

Figure 3:
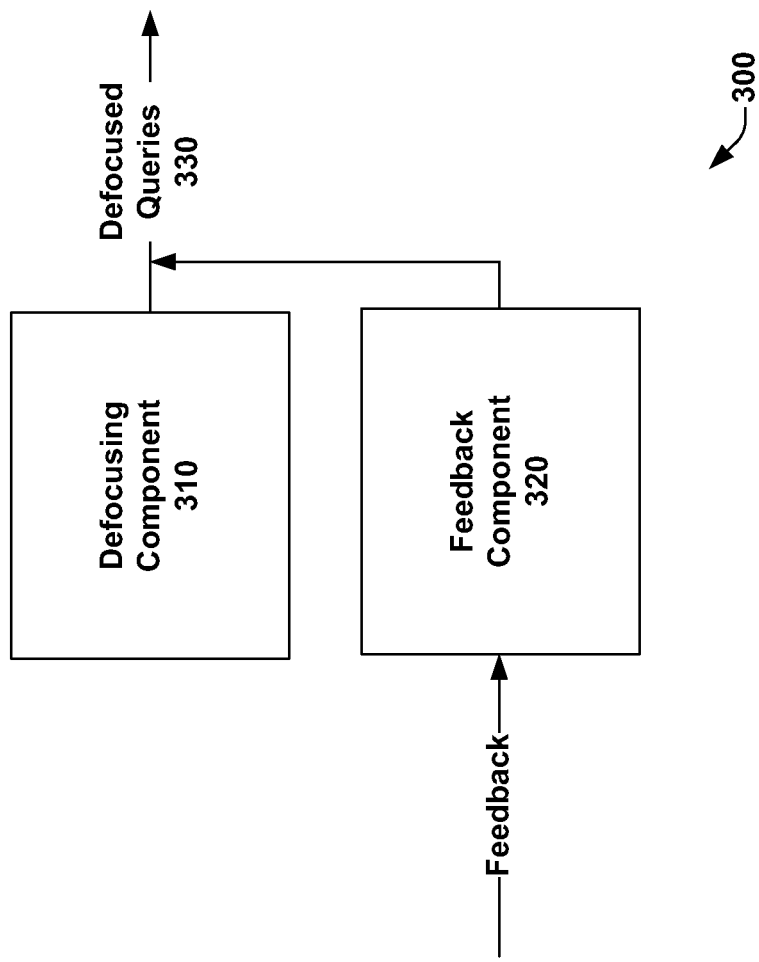
FIG. 3 is a block diagram illustrating an exemplary system that receives and analyzes feedback to modify the defocused queries in accordance with an embodiment.

FIG. 3 is a block diagram illustrating an exemplary system that receives and analyzes feedback to modify the defocused queries in accordance with an embodiment. Generally, system 300 can include defocusing component 310 and feedback component 320. Feedback component receives feedback and can modify the defocused queries 330 that are outputted by defocusing component 310 in response to the feedback.

Feedback component 320 can receive the feedback, and using the feedback can gain an increased understanding of the subject of the queries, or a desired result. The inferences made by the feedback component 320 in analyzing the feedback can be used to further tailor the defocused queries 330 in accordance with the inferences. The feedback allows the defocused queries 330 to be based on other information than just the queries 150 received by analytic component 130. Feedback received by feedback component 320 can include user experience feedback, or can be feedback automatically generated.

In one embodiment, user experience feedback can be feedback from a user in response to the defocused queries 330. Defocusing component 310 can propose multiple sets of defocused queries 330 that a user can select from. Once a choice has been made, feedback component 320 can receive notification of the choice, and can modify defocused queries 330 in response to the choice. Alternatively, feedback component 320 can mine prior selections by a user in order to generate inferences about user preferences and use the inferences to modify the defocused queries 330.

In another embodiment, feedback can include prior selections of queries and data. Feedback component 320 can analyze the prior selections of queries and data and generate new inferences about the prior selections. The new inferences can relate to user preferences, or can project possible future selections of queries and data. Feedback component 320 can use the new inferences to predict user selections and modify defocused queries 330 accordingly.

Figure 4:
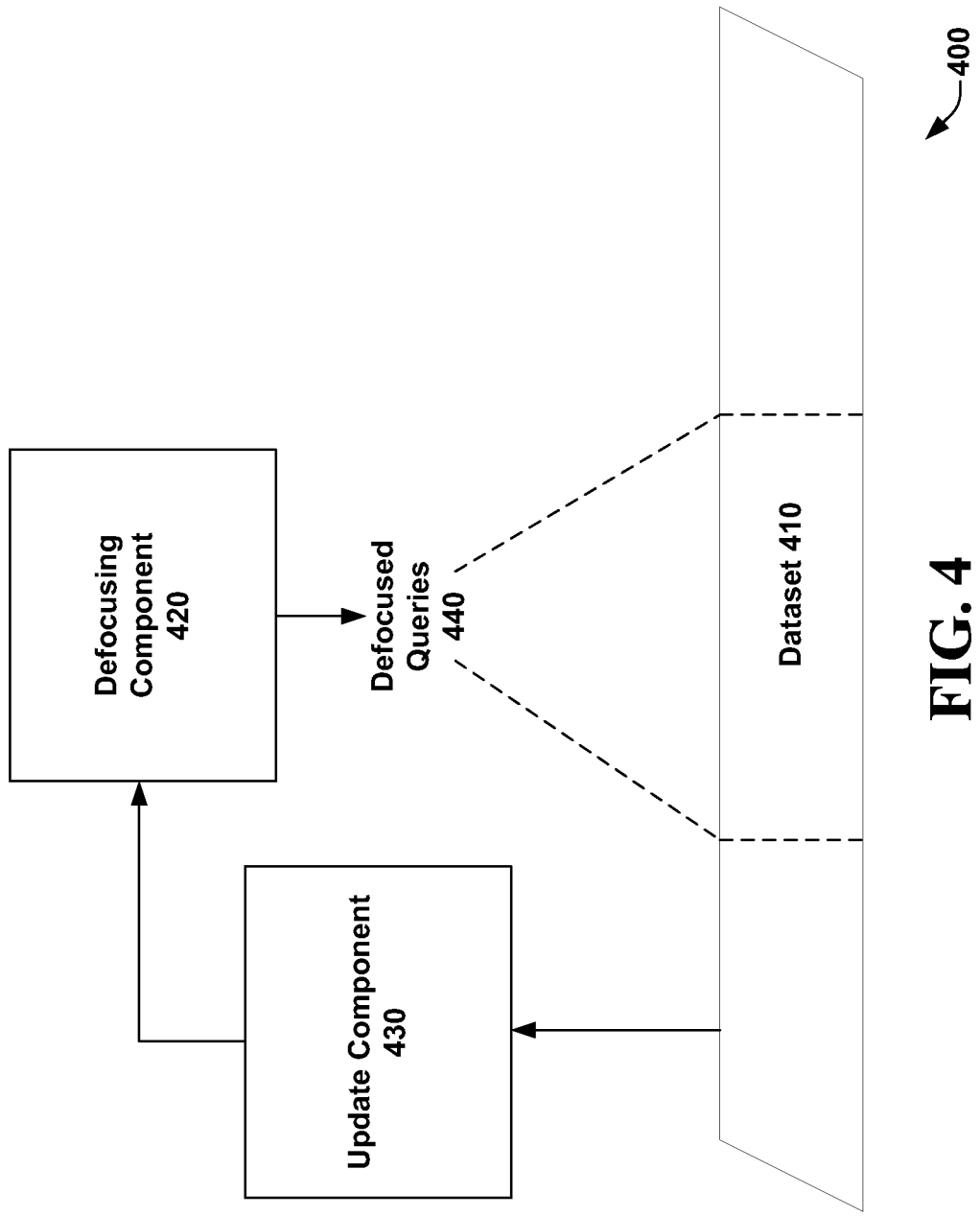
FIG. 4 is a block diagram illustrating an exemplary system for tracking changes in a data set and using the changes to generate defocused queries in accordance with an embodiment.

With reference now to FIG. 4, a block diagram illustrating an exemplary system for tracking changes in a data set and using the changes to generate defocused queries in accordance with an embodiment is shown. System 400 can include update component 430 that monitors and tracks changes to a dataset 410. The tracked changes are used by defocusing component 420 to generate defocused queries 440 that are directed at dataset 410.

The update component 430 can be configured to track changes to the dataset 410 and update the queries in response to the changes to the dataset 410. The data in dataset 410 can be arranged in a different manner than when queries 150 were initially created. Dataset 410 can also lose data that was formerly present, and have additional data added. The queries 150 were directed at the dataset 410 in a previous configuration, and therefore relevant data can potentially be missed by defocused queries 440 unless changes are tracked in dataset 410. Tracking the changes and updating the queries will ensure that all the relevant data is searched.

In another embodiment, as update component 430 tracks changes and additions to the dataset 410, update component 430 can be further configured to analyze the new data to determine that the new data is relevant to the subject of queries 150. In response to determining that the new data is relevant to the subject queries 150, defocusing component 420 can generate defocused queries 440 that are directed solely at the new data. The defocused queries 440 can also incorporate the new data in addition to the original data from dataset 410 so that all of the potentially relevant data can be considered.

Figure 5:
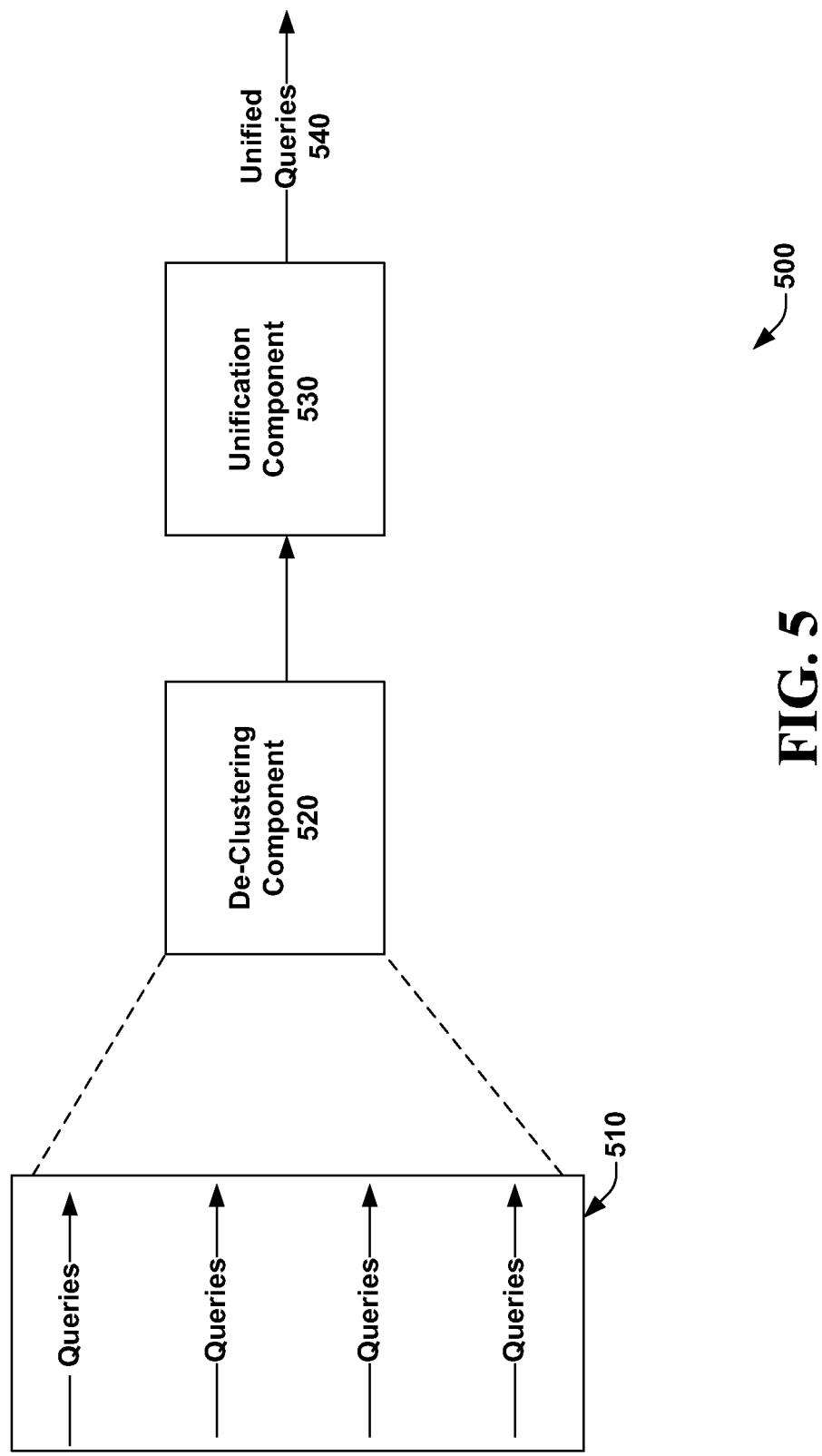
FIG. 5 is a block diagram illustrating an exemplary system for identifying and receiving clusters of queries and creating a unified query in accordance with an embodiment.

Turning now to FIG. 5, a block diagram illustrating an exemplary system for identifying and receiving clusters of queries and creating a unified query in accordance with an embodiment is shown. In system 500, de-clustering component 520 can be provided to receive and analyze clusters of queries 510. Upon identifying commonalities between the clusters of queries 510 by de-clustering component 520, unification component 530 can be provided to propose unified queries 540 and select a second set of data that merge the clusters of queries 510 in response to the commonalities.

The clusters of queries 510 can include sets of queries formed at different times, or directed at different sets of data. The subject of each of the sets of queries can be the same, or can be only partially related to each other. The queries can also originate from a common source, or from multiple sources.

In one embodiment, de-clustering component 520 can automatically identify relationships between the clusters of queries 510. The relationships and commonalities can be identified by matching terms and phrases in the queries, or by determining if the queries share similar datasets. The relationships can also be determined based on the subjects of the queries.

Once the commonalities and relationships are determined for the cluster of queries 510, unification component 530 can propose unified queries 540 that are based on the commonalities. In one embodiment, unification component 530 can merge the clusters of queries 510 in their entirety to form unified queries 540. In selecting the second set of data that unified queries 540 are directed at, the unification component 530 can combine each of the sets of data searched by the clusters of queries 510. Alternatively, unification component 530 can select data for the second set of data that is relevant to the subject of the queries, in response to the commonalities.

In another embodiment, unification component 530 can generate unified queries 540 from scratch, taking the commonalities and relationships into consideration, and formulate the unified queries 540 around the common subject of the clusters of queries 510.

Figure 6:
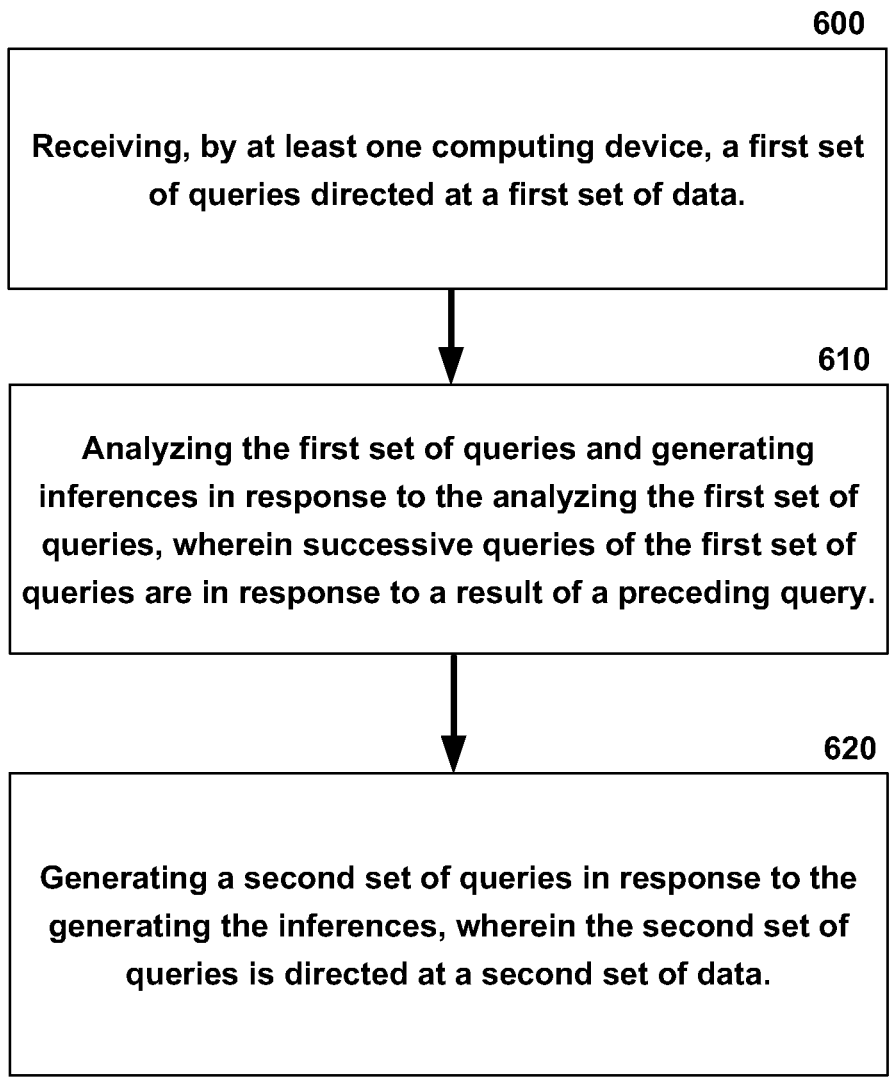
FIG. 6 is a flow diagram illustrating an exemplary non-limiting embodiment for defocusing queries in accordance with an embodiment.
Figure 7:
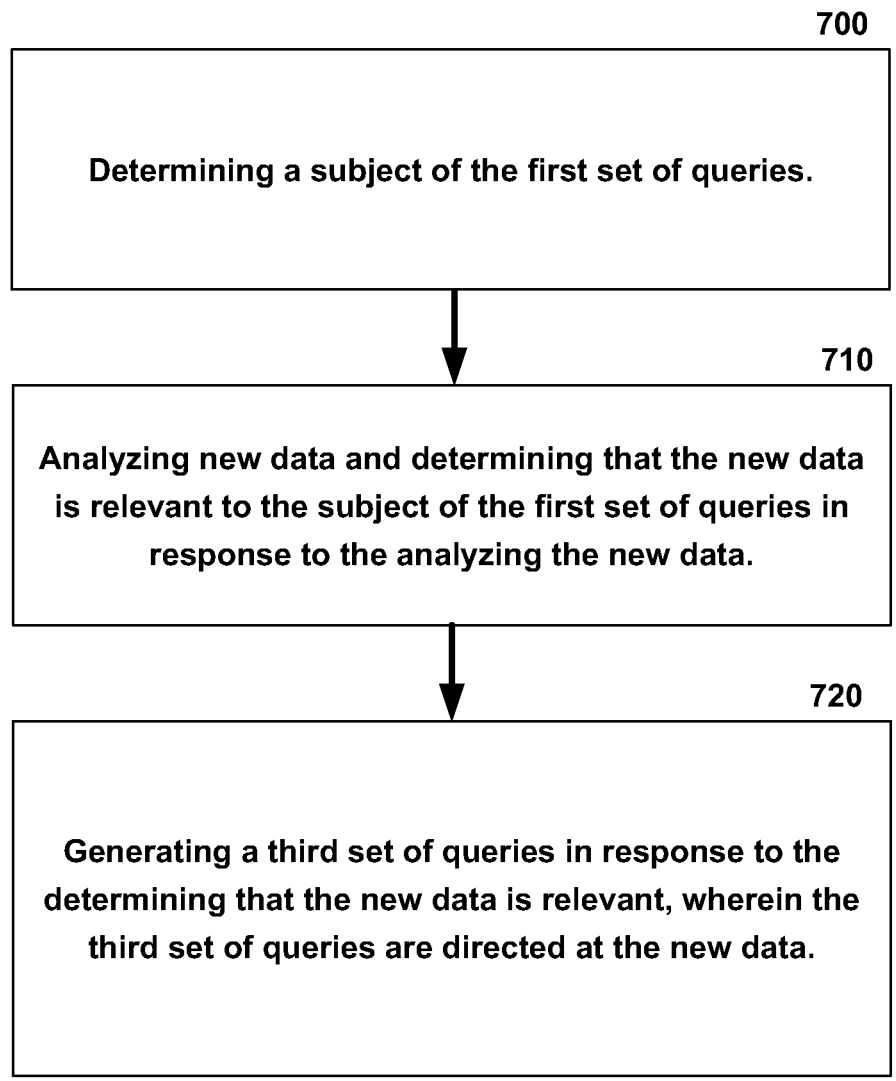
FIG. 7 is a flow diagram illustrating an exemplary non-limiting embodiment for determining if new data is relevant to a subject of the queries and generating new queries incorporating the new data in accordance with an embodiment.

FIG. 6 and FIG. 7 illustrate process in connection with the aforementioned systems. The processes in FIG. 6 and FIG. 7 can be implemented for example by systems 100-500 illustrated in FIG. 1 to FIG. 5 respectively.

FIG. 6 is a flow diagram illustrating an exemplary non-limiting embodiment for defocusing queries in accordance with an embodiment. At 600, a first set of a queries directed at a first set of data are received by at least one computing device. At 610, the first set of queries are analyzed, and inferences are generated in response to the analyzing of the first set of the queries, wherein successive queries of the first set of queries are in response to a result of a preceding query. At 620, a second set of queries is generated in response to the generating the inferences, wherein the second set of queries is directed at a second set of data.

In an embodiment, the inferences can be generated based on the context surrounding the first set of queries such as the time and location that they were created, who created them, and etc. The inferences can also be based on trends in the first set of queries. If successive queries in the first set of queries are narrower than the preceding queries, it is possible to extrapolate a desired result, or a subject of the queries from the trend.

In one embodiment, the second set of data can be selected in response to analyzing the first set of queries. The inferences about a subject of the first set of queries or the desired result can be used to select relevant data for the second set of data.

In a further embodiment the second set of data can be selected from a pool of data, wherein the selecting the second set of data is at least partially random. Introducing a small amount of noise or entropy into the selection process avoids stagnation of data selection where the same data is searched repeatedly. A randomizing function or algorithm can be used in the selection of data so that the second set of data is different than the first set of data, providing different results in response to querying the second set of data.

FIG. 7 is a flow diagram illustrating an exemplary non-limiting embodiment for determining if new data is relevant to a subject of the queries and generating new queries incorporating the new data in accordance with an embodiment. At 700, a subject of the first set of queries can be determined. At 710, new data can be analyzed, and a determination can be made that the new data is relevant to the subject of the first set of queries in response to the analysis of the new data. At 720, a third set of queries can be generated in response to the determining that the new data is relevant, wherein the third set of queries are directed at the new data.

At 700, the subject of the first set of queries can be determined based on the inferences as discussed with regard to step 610 of FIG. 6. The determination of the subject can be based on the context of the first set of queries or by analyzing a narrowing trend in the first set of queries. Once there is a determination about the subject of the first set of queries, new data can be analyzed at 710 in response to that determination.

Analyzing new data ensures that all potentially relevant data is considered. Datasets can change, with the re-ordering, deletion or addition of new data. When data is added, it can potentially be relevant to the subject of the queries, but since the first set of queries are already directed at the first dataset, they would exclude the new data. Accordingly, a third set of queries can be generated that take into account whether the new data is relevant, and if so, will be directed at the new data.

Figure 8:
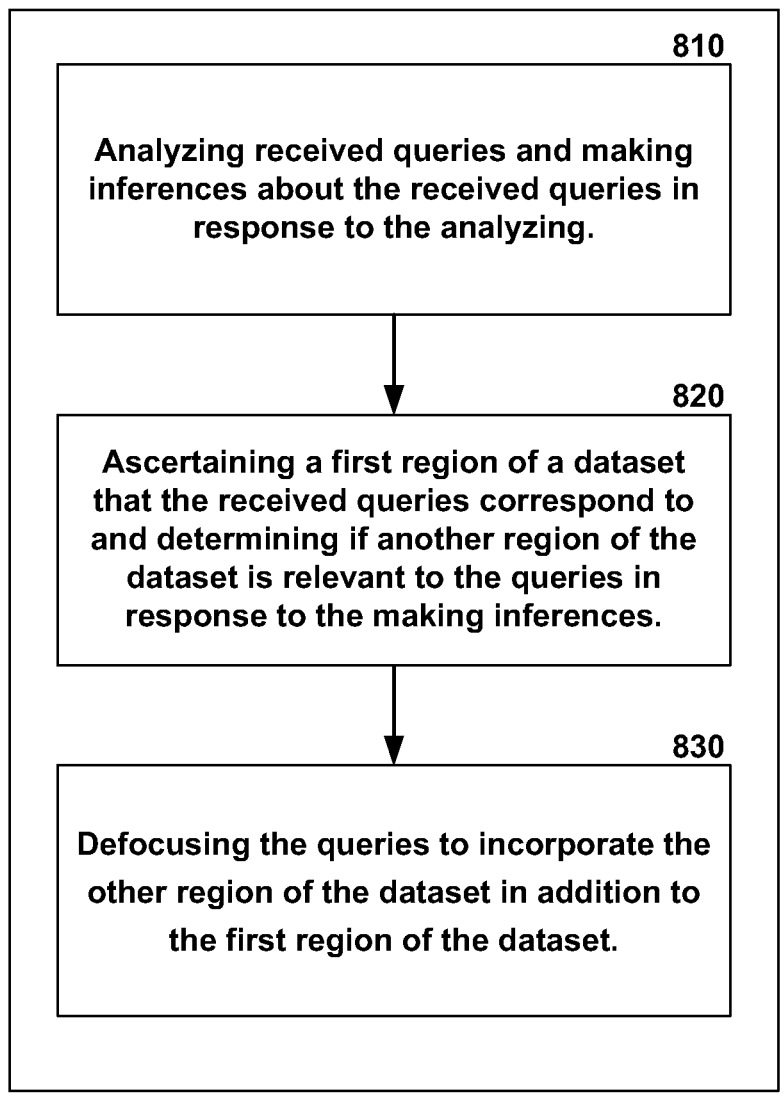
FIG. 8 illustrates a flow diagram of an example, non-limiting embodiment of a set of computer-readable instructions for defocusing queries in accordance with an embodiment.

FIG. 8 illustrates a flow diagram of an example, non-limiting embodiment of a set of computer-readable instructions for defocusing queries in accordance with an embodiment. Computer-readable storage medium 800 can include computer executable instructions that cause a computer to perform operations. At 810, the operations can include analyzing received queries and making inferences about the received queries in response to the analyzing. At 820, the operations can include ascertaining that a first region of a dataset that the received queries correspond to and can further include determining if another region of the dataset is relevant to the queries in response to the making inferences. At 830, the operations can include defocusing the queries to incorporate the other region of the dataset in addition to the first region of the data.

At 810, the analyzing the received queries and making inferences about the received queries can include determining the desired result of the received queries. The inferences can also be related to a subject of the received queries. The inferences can be based on narrowing trends found in the received queries or based on the context in which the received queries where received.

At 830, the defocused queries can incorporate the other region of the data set that is found to be relevant. The defocused queries can be directed at a region of the dataset that is disparate from the region of the dataset that the received queries are directed at. Alternatively, the second set of data can incorporate part of, or the whole of the first set of data that the received queries are directed at.

In one embodiment, feedback can also be received after the defocused queries are generated. The feedback can include feedback from a user in response to the defocused queries. Multiple sets of defocused queries can be selected that user can select from. Once a choice has been made, the set of defocused queries that was selected can be generated. In an alternative embodiment, the feedback can include the results obtained from the defocused queries. The inferences can be updated in response to the results, which can lead to increasingly relevant results at every iteration.

At 820, the determining that another region of the data set is relevant can be triggered in response to a modification of the dataset. As changes are tracked in the dataset, any change can automatically trigger an analysis of the changed region to determine if the changed region is relevant. If that region is deemed to be relevant, the defocused queries can incorporate that region of the data.

Exemplary Networked and Distributed Environments

One of ordinary skill in the art can appreciate that the various embodiments for defocusing queries over big data as described herein can be implemented in connection with any computer or other client or server device, which can be deployed as part of a computer network or in a distributed computing environment, and can be connected to any kind of data store. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the mechanisms for defocusing queries over big data as described for various embodiments of the subject disclosure.

Figure 9:
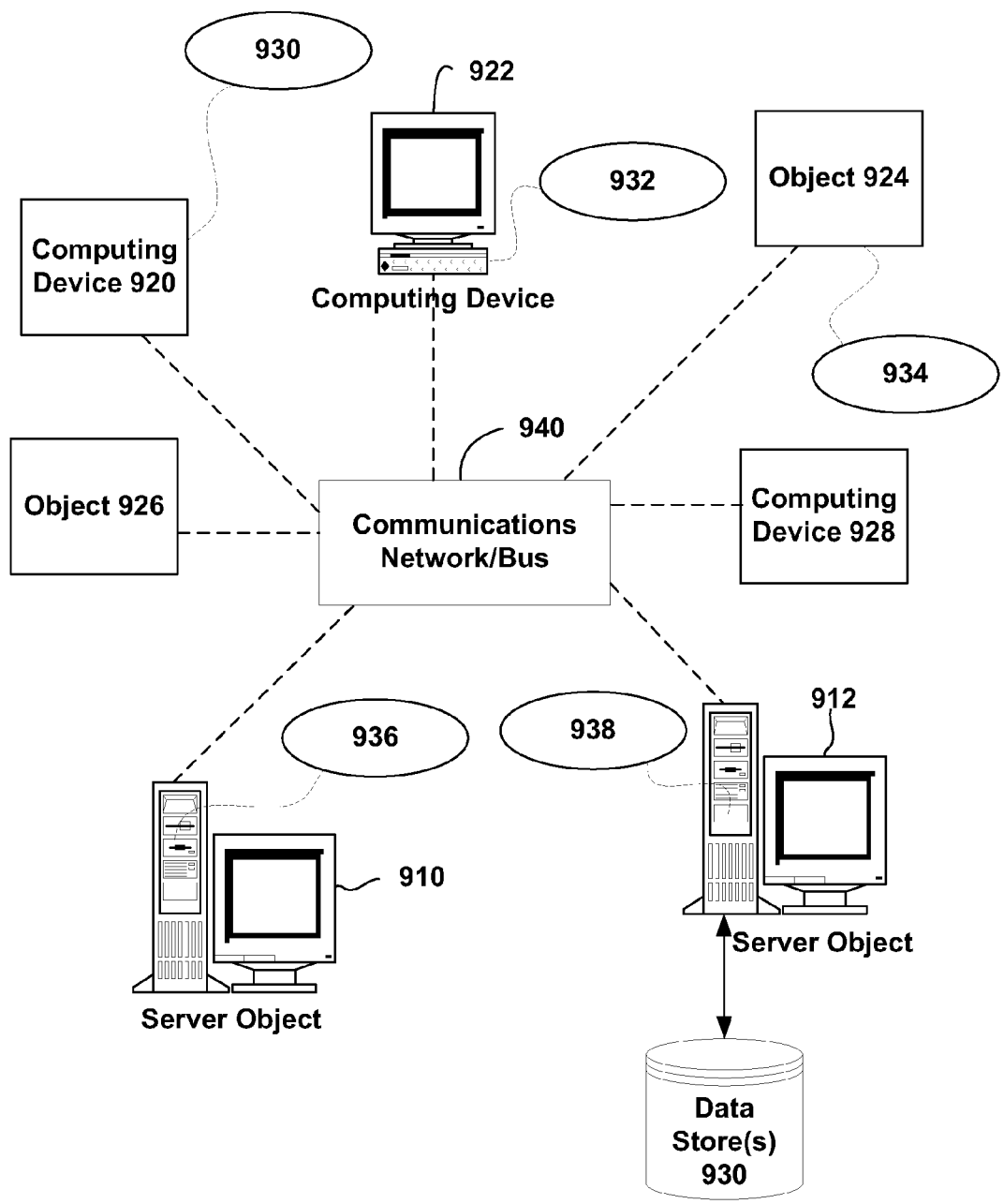
FIG. 9 is a block diagram representing exemplary non-limiting networked environments in which various embodiments described herein can be implemented.

FIG. 9 provides a schematic diagram of an exemplary networked or distributed computing environment. The distributed computing environment comprises computing objects 910, 912, etc. and computing objects or devices 920,

922, 924, 926, 928, etc., which may include programs, methods, data stores, programmable logic, etc., as represented by applications 930, 932, 934, 936, 938 and data store(s) 940. It can be appreciated that computing objects 910, 912, etc. and computing objects or devices 920, 922, 924, 926, 928, etc. may comprise different devices, such as personal digital assistants (PDAs), audio/video devices, mobile phones, MP3 players, personal computers, laptops, etc.

Each computing object 910, 912, etc. and computing objects or devices 920, 922, 924, 926, 928, etc. can communicate with one or more other computing objects 910, 912, etc. and computing objects or devices 920, 922, 924, 926, 928, etc. by way of the communications network 942, either directly or indirectly. Even though illustrated as a single element in FIG. 9, communications network 942 may comprise other computing objects and computing devices that provide services to the system of FIG. 9, and/or may represent multiple interconnected networks, which are not shown. Each computing object 910, 912, etc. or computing object or devices 920, 922, 924, 926, 928, etc. can also contain an application, such as applications 930, 932, 934, 936, 938, that might make use of an API, or other object, software, firmware and/or hardware, suitable for communication with or implementation of the techniques for defocusing queries provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems for defocusing queries as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, i.e., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 9, as a non-limiting example, computing objects or devices 920, 922, 924, 926, 928, etc. can be thought of as clients and computing objects 910, 912, etc. can be thought of as servers where computing objects 910, 912, etc., acting as servers provide data services, such as receiving data from client computing objects or devices 920, 922, 924, 926, 928, etc., storing of data, processing of data, transmitting data to client computing objects or devices 920, 922, 924, 926, 928, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network 942 or bus is the Internet, for example, the computing objects 910, 912, etc. can be Web servers with which other computing objects or devices 920, 922, 924, 926, 928, etc. communicate via any of a number of known protocols, such as the hypertext transfer protocol (HTTP). Computing objects 910, 912, etc. acting as servers may also serve as clients, e.g., computing objects or devices 920, 922, 924, 926, 928, etc., as may be characteristic of a distributed computing environment.

Exemplary Computing Device

As mentioned, advantageously, the techniques described herein can be applied to any device where it is desirable to defocus queries over big data for extraction of an unknown value a computing system. It can be understood, therefore, that handheld, portable and other computing devices and computing objects of all kinds are contemplated for use in connection with the various embodiments, i.e., anywhere that resource usage of a device may be desirably optimized. Accordingly, the below general purpose remote computer described below in FIG. 10 is but one example of a computing device.

Although not required, embodiments can partly be implemented via an operating system, for use by a developer of services for a device or object, and/or included within application software that operates to perform one or more functional aspects of the various embodiments described herein. Software may be described in the general context of computer-executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol should be considered limiting.

Figure 10:
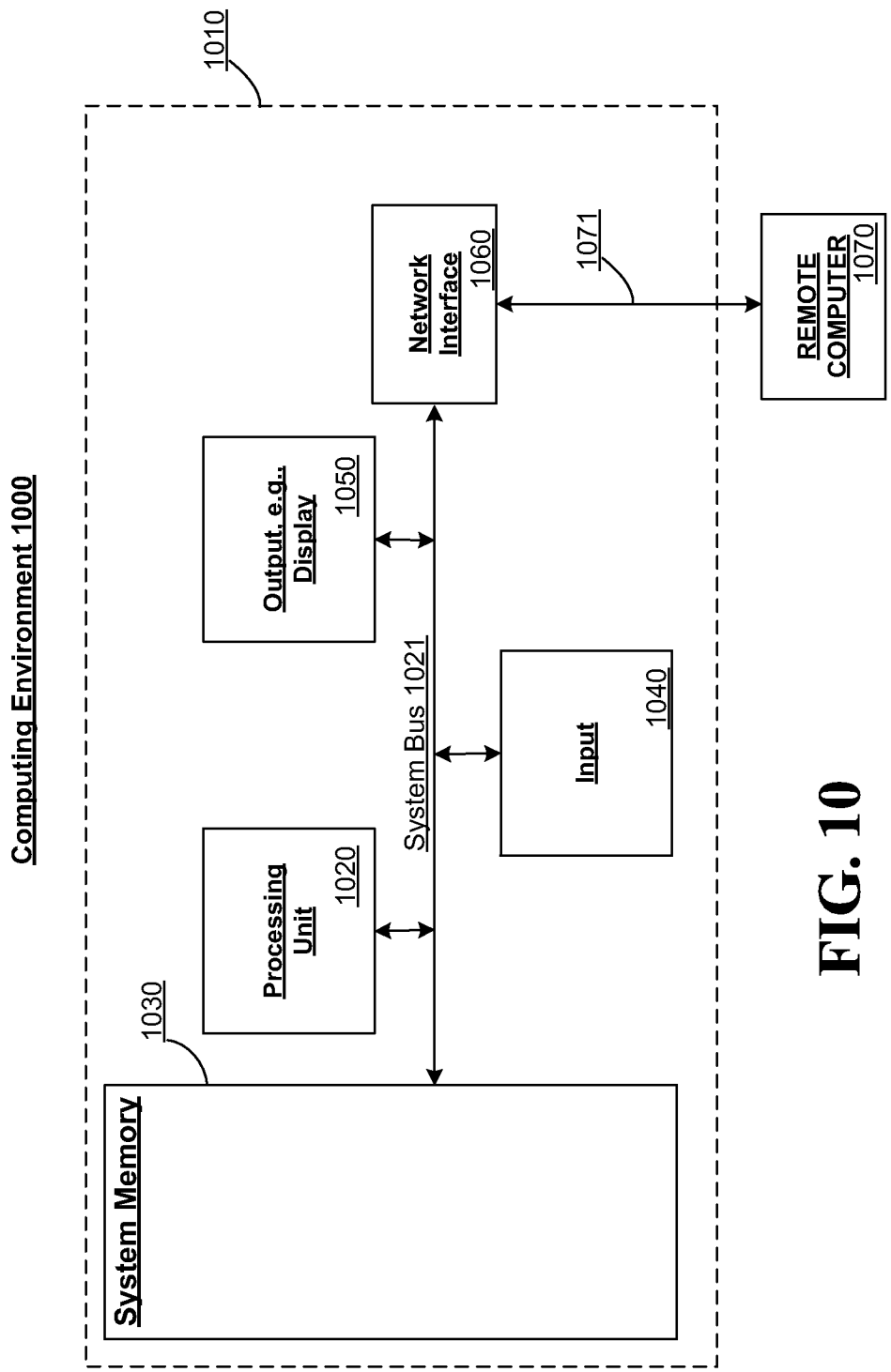
FIG. 10 is a block diagram representing an exemplary non-limiting computing system or operating environment in which one or more aspects of various embodiments described herein can be implemented.

FIG. 10 thus illustrates an example of a suitable computing system environment 1000 in which one or aspects of the embodiments described herein can be implemented, although as made clear above, the computing system environment 1000 is only one example of a suitable computing environment and is not intended to suggest any limitation as to scope of use or functionality. Neither should the computing system environment 1000 be interpreted as having any dependency or requirement relating to any one or combination of components illustrated in the exemplary computing system environment 1000.

With reference to FIG. 10, an exemplary remote device for implementing one or more embodiments includes a general purpose computing device in the form of a computer 1010. Components of computer 1010 may include, but are not limited to, a processing unit 1020, a system memory 1030, and a system bus 1022 that couples various system components including the system memory to the processing unit 1020.

Computer 1010 typically includes a variety of computer readable media and can be any available media that can be accessed by computer 1010. The system memory 1030 may include computer storage media in the form of volatile and/or nonvolatile memory such as read only memory (ROM) and/or random access memory (RAM). By way of example, and not limitation, system memory 1030 may also include an operating system, application programs, other program modules, and program data. According to a further example, computer 1010 can also include a variety of other media (not shown), which can include, without limitation, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information.

A user can enter commands and information into the computer 1010 through input devices 1040. A monitor or other type of display device is also connected to the system bus 1022 via an interface, such as output interface 1050. In addition to a monitor, computers can also include other peripheral output devices such as speakers and a printer, which may be connected through output interface 1050.

The computer 1010 may operate in a networked or distributed environment using logical connections, such as network interfaces 1060, to one or more other remote computers, such as remote computer 1070. The remote computer 1070 may be a personal computer, a server, a router, a network PC, a peer device or other common network node, or any other remote media consumption or transmission device, and may include any or all of the elements described above relative to the computer 1010. The logical connections depicted in FIG. 10 include a network 1072, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system.

In addition, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described herein, and similarly, storage can be effected across a plurality of devices. Accordingly, the subject matter should not be limited to any single embodiment, but rather should be construed in breadth, spirit and scope in accordance with the appended claims.

What is claimed is:

1. A method, comprising:
  receiving, by at least one computing device, a first set of queries directed at a first set of data;
  analyzing the first set of queries and generating inferences in response to the analyzing the first set of queries, wherein successive queries of the first set of queries are in response to a result of a preceding query; and
  generating a second set of queries in response to the generating the inferences, wherein the second set of queries is directed at a second set of data.

2. The method of claim 1, further comprising selecting the second set of data from a pool of data, wherein the selecting the second set of data is at least partially random.

3. The method of claim 1, further comprising selecting the second set of data in response to analyzing the first set of queries.

4. The method of claim 1, wherein the generating inferences further comprises determining a target result of the first set of queries.

5. The method of claim 4, further comprising:
analyzing new data and determining that the new data is relevant to the subject of the first set of queries in response to the analyzing the new data;
generating a third set of queries in response to the determining that the new data is relevant, wherein the third set of queries are directed at the new data.

6. The method of claim 1, further comprising:
receiving feedback relating to the second set of queries;
generating a new set of queries in response to the receiving the feedback; and
directing the new set of queries at new data.

7. The method of claim 6, wherein the receiving feedback further comprises:
tracking selections of queries and data;
generating new inferences in response to the tracking selections.

8. The method of claim 1, wherein the generating the second set of queries includes generating a set of queries broader than the first set of queries.

9. A system, comprising:
a memory having computer executable components stored thereon; and
a processor communicatively coupled to the memory, the processor configured to facilitate execution of the computer executable components, the computer executable components comprising:
an analytic component configured to receive queries directed at a first set of data and is further configured to analyze the queries to generate inferences about the queries; and
a defocusing component configured to create defocused queries in response to the inferences, wherein the defocused queries are broader than the queries received by the analytic component.

10. The system of claim 9, wherein the inferences are related to a subject of the queries.

11. The system of claim 9, wherein the defocused queries are directed at a second set of data disparate from the first set of data.

12. The system of claim 11, wherein the second set of data includes at least a portion of the first set of data.

13. The system of claim 11, wherein the second set of data is selected in response to the inferences, and is at least partially relevant to a subject of the queries.

14. The system of claim 9, further comprising a feedback component configured to receive feedback and modify the defocused queries in response to the feedback.

15. The system of claim 9, further comprising an update component configured to track changes to the first set of data and update the queries in response to the changes to the first set of data.

16. The system of claim 9, further comprising:
a de-clustering component configured to identify commonalities between clusters of queries;
a unification component configured to propose new queries and select a second set of data that merge the clusters of queries in response to the commonalities.

17. A computer-readable storage medium comprising computer-readable instructions that, in response to execution, cause a computing system to perform operations, comprising:
analyzing received queries and making inferences about the received queries in response to the analyzing;
ascertaining a first region of a dataset that the received queries correspond to and determining whether another region of the dataset is relevant to the queries in response to the making inferences; and
defocusing the queries to incorporate the other region of the dataset in addition to the first region of the dataset.

18. The computer-readable storage medium of claim 17, wherein the defocusing includes broadening the queries.

19. The computer-readable storage medium of claim 17, further comprising receiving feedback after the defocusing the queries and generating updated inferences in response to the receiving feedback.

20. The computer-readable storage medium of claim 17, further comprising conducting the determining that another region of the dataset is relevant in response to a modification of the dataset.

* * * * *